United States Patent [19]

Noell et al.

[11] Patent Number: 4,553,914

[45] Date of Patent: Nov. 19, 1985

[54] METHOD AND APPARATUS FOR MAIN FUEL PUMPING SYSTEM HAVING BACKUP PUMP

[75] Inventors: Godwin L. Noell, Winsted; Jack G. Sundberg, Meriden, both of Conn.

[73] Assignee: Chandler Evans Inc., West Hartford, Conn.

[21] Appl. No.: 583,353

[22] Filed: Feb. 24, 1984

[51] Int. Cl.$^4$ ............................................. F01C 21/00
[52] U.S. Cl. ...................................... 418/69; 417/319
[58] Field of Search ................. 418/69; 417/319, 426, 417/429

[56] References Cited

U.S. PATENT DOCUMENTS

| | | | |
|---|---|---|---|
| 2,376,917 | 5/1945 | Hiltz | 417/429 X |
| 2,665,638 | 1/1954 | Lauck | 418/69 |
| 2,699,724 | 1/1955 | Murray et al. | 418/69 |
| 2,767,658 | 10/1956 | Murray | 418/69 X |
| 2,775,204 | 12/1956 | Batten et al. | 417/319 |
| 3,008,426 | 11/1961 | Edwards et al. | 418/69 X |

Primary Examiner—Richard E. Gluck
Attorney, Agent, or Firm—Radford W. Luther; Richard A. Dornon

[57] ABSTRACT

A pumping system has a main pumping unit (14) and a backup pumping unit (16) mounted in a common housing (4) and adapted to be driven by a drive member (44). The main pumping unit is connected to the drive member by a main drive coupling (68) which incorporates a reduced shear section (76) designed to fail upon a jamming or seizure of the main pumping unit. A backup drive coupling (78) connected to the backup pumping unit is adapted to be axially displaced and threadably connected to the drive member after stoppage of the main pumping unit. An actuation device (18) functions to axially displace the backup drive coupling to establish threaded engagement. When the backup drive coupling is engaged with the drive member, the backup pumping unit will provide flow.

4 Claims, 1 Drawing Figure

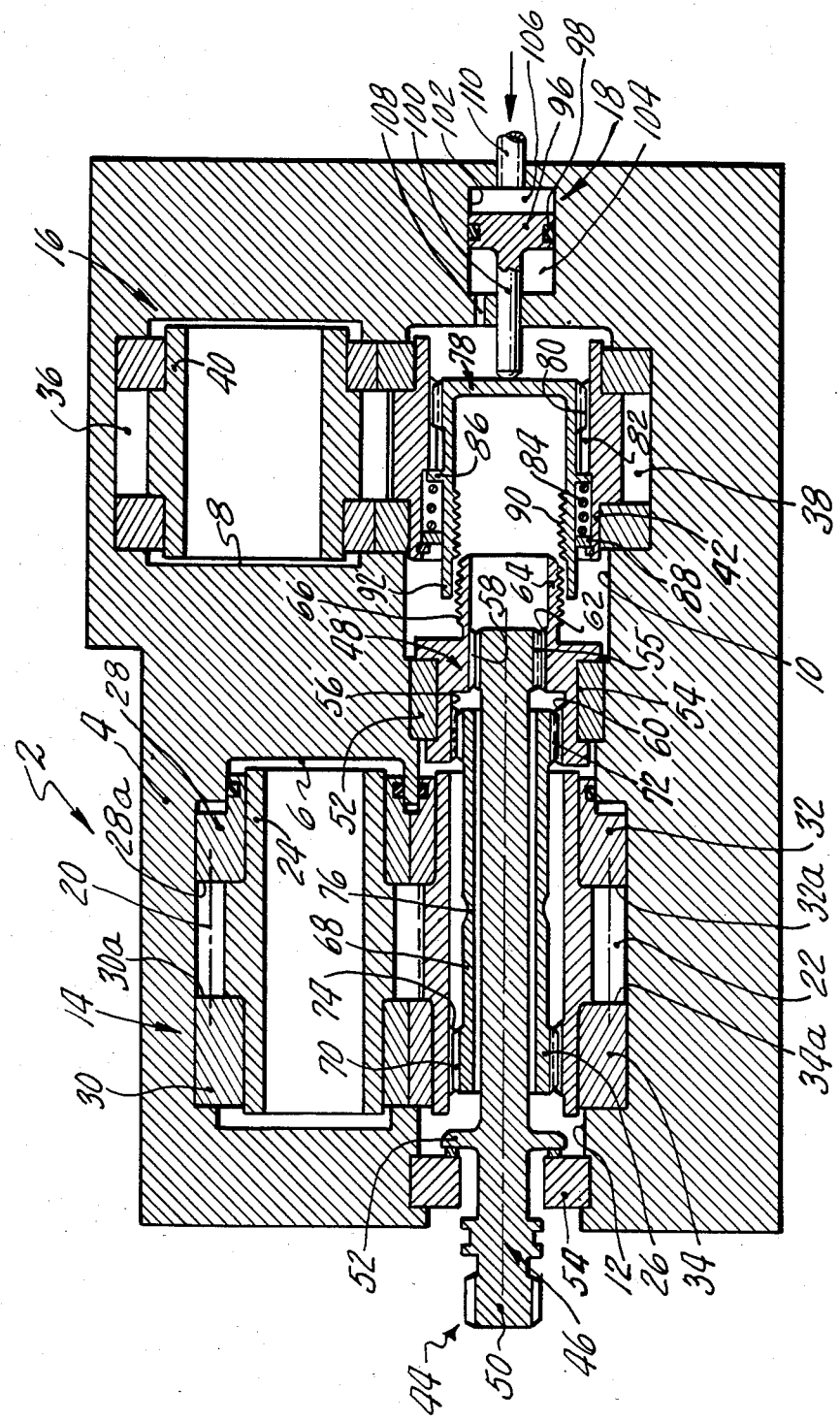

METHOD AND APPARATUS FOR MAIN FUEL PUMPING SYSTEM HAVING BACKUP PUMP

TECHNICAL FIELD

This invention relates to fuel pumps and more particularly to aircraft fuel pumps.

BACKGROUND ART

Fuel pumping systems for aircraft which embody a redundant pump are known in the prior art. One type of pumping system incorporates two positive displacement pumping units driven by a common driving means but independently operable in the event of failure of one of the pumping units. This type of pumping system is shown in U.S. Pat. No. 3,008,426. A second type of pumping system incorporates a remotely mounted backup pump having its own drive means. An example of the second type of pumping system is disclosed in U.S. patent application No. 06/430,828 filed Sept. 30, 1982, entitled Tank Mounted Backup Fuel Pump.

Obviously, two drawbacks inherent in the first type of pumping system are that both pumping units are constantly running during operation and that performance must necessarily be affected with operation of only one pumping unit. The second type of pumping system suffers from complexity in that an alternate mounting arrangement and separate driving means are required.

DISCLOSURE OF THE INVENTION

In accordance with the invention, there is provided a pumping system incorporating a main pumping unit and a backup pumping unit which remains inoperative until failure of the main pumping unit. A drive shaft is connected to the main pumping unit by frangible coupling means. Threaded coupling means are adapted to interconnect the drive shaft and the backup pumping unit upon failure of the main pumping unit.

A pumping system of the invention is advantageous since both pumping units are adapted to be driven by a common drive means and may be contained in a common housing such that additional mounting means are obviated. Moreover, in a pumping system of the invention the backup pumping unit is not constantly running but is only rendered operative upon failure of the main pumping unit. If mandated by the application, the backup pumping unit may be sized so as not to adversely affect performance during backup operation.

Accordingly, it is a primary object of the invention to provide a pumping system having a main pumping unit and a backup pumping unit which are capable of independent operation but are driven by a common drive means and a method of operating such a system.

This and other objects and advantages of the invention will become more readily apparent from the following detailed description when taken in conjunction with the accompanying drawing, in which:

BRIEF DESCRIPTION OF DRAWING

The drawing shows a schematic view of a pumping system according to the invention.

BEST MODE OF CARRYING OUT THE INVENTION

Referring to the drawing, there is shown a pumping system of the invention, (generally shown at 2), for supplying fuel to an aircraft gas turbine engine. The pumping system 2 has a housing 4 with a main pumping cavity 6 and a backup pumping cavity 8 which are joined by a chamber 10. A passage 12 adjacent the front or left of the housing 4 extends from the front of the housing to the pumping cavity 6.

A main pumping unit, generally indicated at 14, is disposed in the pumping cavity 6 and a backup pumping unit, generally designated 16, is disposed in the pumping cavity 8. Both pumping units are constituted by conventional gear pumps. In the event of failure of the main pumping unit, an emergency actuation device 18 senses such a failure and initiates operation of the backup pumping unit by coupling it to the pump drive member. Thereafter, the backup pumping unit provides the necessary engine pump flow.

Within the pumping cavity 6 are mounted the usual pair of meshing gears 20 and 22. The gears 20 and 22, each of which are carried by shaft journals 24 and 26, are mounted for rotation within the interior portions of bearings 28, 30, 32 and 34. The bearings 28 and 32 have their faces 28a and 32a in respective wiping engagement with the right side faces of the gears 20 and 22. Similarly, the faces 30a and 34a of the bearings 30 and 34 are in respective wiping engagement with the left side faces of the gears 20 and 22. The faces of the gears and the faces of the bearings are urged into firm engagement by the usual spring and pressure generated forces. Within the pumping cavity 8 are mounted meshing gears 36 and 38 each of which are carried by shaft journals 40 and 42, respectively. The shaft journals 40 and 42 are mounted for rotation in bearings similar to those lcoated in the pumping cavity 6.

A drive member, generally shown at 44, extends from the exterior of the housing 4 through the passage 12 and the cavity 6 into the chamber 10. Drive member 44 is comprised of a drive shaft 46 and a drive element 48 which is connected thereto such that both the shaft 46 and the drive element 48 rotate in unison and always occupy fixed axial stations with respect to the housing 4 and each other. The drive shaft 46 has the usual splined end 50 for connection to an engine accessory section and has a flange 52 having a seal face in engagement with a carbon faced seal 54 mounted in the housing 4. The drive shaft 46 also incorporates external splines 55 at its right or rear end. It should be noted that drive member 44 functions to drive not only the main pumping unit 14 but also the backup pumping unit 16 as is explained hereinafter.

The drive element 48 serves to transmit driving force to both main pumping unit 14 and backup pumping unit 16. The drive element 48 is mounted for rotation in the chamber 10 by means of a bearing 52 mounted in the housing 4 and received within an annular recess 54 on the outer periphery of the drive element 48. The interior of the drive element 48 is formed with a bore 56 and a reduced diameter bore 58 in communication therewith. The walls of the bores 56 and 58 are provided with internal splines 60 and 62, respectively. The drive element 48 also includes a tubular extension 64, having a threaded section 66 on its exterior periphery, projecting rearwardly from the right side of the drive element 48. Torque is transmitted to the drive element 48 by the splines 55 which mate with the splines 62.

A tubular-shaped main drive coupling 68 surrounds a segment of the drive shaft 50 in coaxial relationship therewith. The main drive coupling 68 has external splines 70 and 72 located at its front and rear ends, respectively. The external splines 70 are in mating engagement with internal splines 74 formed on the interior of the shaft journal 26; and the external splines 72 are in mating engagement with the internal splines 60 on the drive element 48. Hence, rotation of the drive member 44, produces a consequential rotation of the gear 22 and the gear 20, thereby resulting in operation of the main pumping unit 14. The main drive coupling 68 is formed with a reduced shear section 76 whereby any abnormal force resulting from jamming or seizure of the main pumping unit 14 will effect a torsional yielding or failure of the reduced shear section 76, thereby terminating further operation of the main pumping unit 14. It will, however, be appreciated that any such stoppage will have no effect whatsoever on the continuing rotation of the drive member 44, i.e., the drive shaft 50 and the drive element 48.

A cup-shaped backup drive coupling 78 is mounted within the cylindrical interior of the shaft journal 42 for axial sliding movement therein between its normal or illustrated position and a forward engagement position in which it engages the drive element 48. The backup drive coupling has external splines 80 on its outer rear periphery which are in mating engagement with longer internal splines 82 fashioned upon the interior wall of the shaft journal 42 and are slidable in the voids between the internal splines 82. In order to bias the backup drive coupling rearwardly, away from engagement with the drive element 48, a compression spring 84 is positioned in surrounding relationship to the backup drive coupling 78 and is seated against a flange 86 on the coupling 78 and a snap ring 88 mounted in the interior of the shaft journal 42. The interior wall of the backup drive coupling 78 embodies a threaded section 90, the threads of which are adapted to be screwed on the threads of threaded section 66 during forward or leftward axial movement of the backup drive coupling 78 when the drive member 44 is rotating. During backup unit engagement, forward axial movement of the backup drive coupling 78 is adapted to continue until the lip 92 thereof abuts the rear face 94 of the drive element 48 whereupon the backup pumping unit 16 commences operation as torque from the drive member 44 will be transmitted thereto. Torque will be transmitted from the drive member 44 to the backup pumping unit 16 through the resulting threaded engagement and the splined engagement between the backup drive coupling 78 and the shaft journal 42.

The actuation device 18 axially displaces the backup drive coupling 78. The actuation device 92 is preferably constituted by a piston 96 having an O-ring 98 and a stem 100 attached thereto with a tip adapted to contact the base of the backup drive coupling 78. Piston 96 is mounted in a cylinder 102 (through which the stem 100 extends) in such a manner as to divide the cylinder into a forward chamber 104 and a rear chamber 106, the former of which is referenced to the low pressure by a conduit 108 (e.g., boost pressure) to which the interior of the shaft journal 42 is exposed and the latter of which is referenced to a higher signal pressure. The signal pressure is supplied to chamber 106 via a conduit 110 by appropriate means such as a solenoid operated valve which may be controlled manually or automatically in accordance with the mandates of the selected application. When the piston 96 is subjected to the signal pressure, the tip of the stem 100 pushes the backup coupling over the tubular extension 64 to thereby establish threaded engagement between the extension 64 and the backup drive coupling 78.

For purposes of understanding operation of a pumping system of the invention, assume that the main pumping unit 14 seizes, thereby effecting in a failure of the reduced shear section 76. Upon failure of the shear section 76, operation of the main pumping unit is terminated although the rear segment of the main drive coupling 68 continues to rotate and is supported for such rotation by the engagement between splines 60 and 72 at the rear end thereof. Of course, the forward segment of the main drive coupling 68 is at rest when the gears 20 and 22 of the main pumping unit cease rotation.

Failure of the main pumping unit 14 may be sensed by a pressure sensitive switch and indicated to an aircraft operator by a low fuel pressure warning light. A solenoid operated valve may then be either manually or automatically energized so as to direct high pressure hydraulic fluid (which could be fuel or hydraulic fluid) through the conduit 110 and into the chamber 106. Upon application of a high pressure behind the piston 96, the piston 96 slews forwardly, against the bias of the spring 84, a distance sufficient to insure that threaded engagement between the threads of sections 66 and 90 of the drive element 48 and the backup drive coupling has been established. It will be appreciated that once initial threaded engagement is effectuated, the backup drive coupling 78 will be screwed upon the tubular extension 64 without any further urging from the actuation device 18. When the lip 92 of the backup drive coupling 78 finally contacts the right face of the drive element 48 the drive member 44, the backup drive coupling 78 and the shaft journal 42 will rotate in unison thereby bringing the backup pumping unit 16 into operation. Thereafter, backup pumping unit 16 will provide the necessary fuel flow. Upon generation of sufficient pressure by the backup pumping unit, the solenoid operated valve may be deenergized by automatic or manual means.

Obviously, many variations and modifications are possible in light of the above teachings without departing from the scope or spirit of the invention as defined in the appended claims. For example, the pumping units need not be gear pumps but could be constituted by other types of pumps such as vane pumps. Moreover, the actuation device 18 could take the form of a simple solenoid with its plunger in engagement with the backup drive coupling 78 or some form of motor such as an electric motor. Another alternative to the specific actuation device illustrated would be a piston arrangement similar to that shown but having a spring on one side thereof and being exposed to discharge pressure on the other side thereof.

We claim:

1. A pumping system comprising:
   a housing;
   a main pumping unit mounted in the housing for pumping fluid, the main pumping unit being normally operative;
   a backup pumping' unit mounted in the housing for pumping fluid in the event of a seizure or jamming of the main pumping unit, the backup pumping unit being normally inoperative;
   a drive member mounted for rotation in the housing for running both the main pumping unit and the backup pumping unit;
   a main drive coupling mounted in the housing for drivingly interconnecting the drive member and the main pumping unit such that rotation of the drive member operates the main pumping unit, the main drive coupling including frangible coupling means to insure continued rotation of the drive member in the event of a seizure or jamming of the main pumping unit;

a backup drive coupling for drivingly interconnecting the drive member and the backup pumping unit mounted in the housing adjacent the drive member for axial sliding movement therein, the backup drive coupling being in driving engagement with the backup pumping unit and normally being in disengaged relationship to the drive member;

cooperating means on the drive member and the backup drive coupling to establish driving engagement between the drive member and the backup drive coupling upon axial movement of the backup drive coupling; and an actuation device mounted in the housing for producing axial movement of the backup drive coupling upon a seizure or jamming of the main pumping unit such that the backup pumping unit may be rendered operative.

2. The pumping system of claim 1, wherein the cooperating means comprises:

a threaded section on the drive member; and a threaded section on the backup drive coupling.

3. The pumping system of claim 2, wherein the drive member comprises:

a drive shaft; and a drive element in splined engagement therewith and with the main drive coupling, the first mentioned threaded section being located on the drive element.

4. The pumping system of claim 3, further comprising:

means to bias the backup drive coupling to a position in disengaged relationship to the drive element.

* * * * *